June 27, 1967    J. N. NORTH    3,327,526
DIESEL ENGINE TIMER
Filed Feb. 17, 1965    2 Sheets-Sheet 2

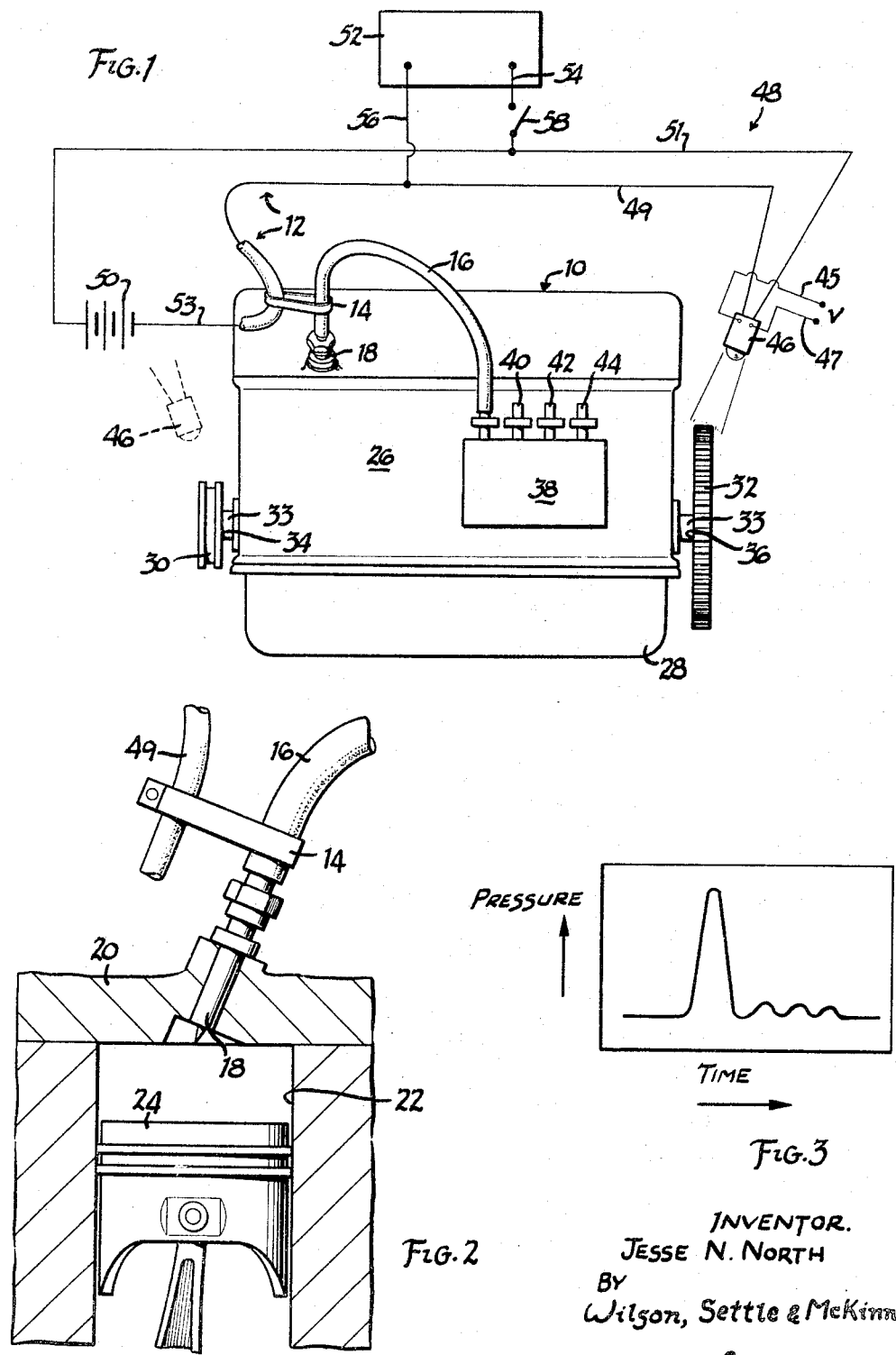

INVENTOR.
JESSE N. NORTH
BY
Wilson, Settle & McKinnon
ATTORNEYS

United States Patent Office 3,327,526
Patented June 27, 1967

3,327,526
DIESEL ENGINE TIMER
Jesse N. North, Box 144, Harbert, Mich. 49115
Filed Feb. 17, 1965, Ser. No. 433,374
3 Claims. (Cl. 73—118)

ABSTRACT OF THE DISCLOSURE

A sensing device to be used with a fuel injection engine timing system or other system wherein the time of fuel injection into internal combustion engines or other propulsion systems is required to be known. The device includes means for measuring the fuel line expansion by apparatus exteriorly connected to the fuel line and producing a resultant signal as a function of the time of fuel injection through the line.

The present invention relates generally to a system for checking the timing of an internal combustion engine and, more particularly, to a system, including method and apparatus, for timing an internal combustion engine of the fuel injection type wherein the time of fuel injection into an engine cylinder is correlated with the instantaneous position of the engine crankshaft by sensing the passage of each charge of fuel through the cylinder fuel line at a position along the external surface of the fuel line. Such sensing may likewise be used to count engine RPM concurrently with or alternatively to the checking of the engine timing. The system of this invention, though developed primarily for timing diesel engines, may be utilized with not only compression ignition engines but also with fuel injection, spark ignited engines.

The injection timing of internal combustion engines where the fuel is injected into the engine cylinders, such as with compression combustion diesel engines, has in the past, been cumbersome, time consuming, and subject to inaccuracies. Several prior art injection timing systems, not wholly satisfactory, have been proposed.

First, it has been widely accepted practice to statically determine the start of fuel injection into a diesel engine cylinder. This is performed manually by removing the deliver valve of the fuel injection pump and thereafter either (1) turning the pump or (2) turning the entire engine until the pump delivers a charge of fuel through a fuel injection line to a given engine cylinder. The point in time when the fuel delivery from the pump stops is generally considered to be the time at which fuel injection into the cylinder per se is commenced through the injection nozzle at the cylinder head. Injection of the charge of fuel into the cylinder is correlated with the compression stroke of the piston by either (1) adjusting the time of opening of the injection nozzle or (2) lining up a reference marking on the pump in alignment with the engine when the engine is in a certain position with respect to the top dead center of the compression stroke. As can be readily appreciated, this system, although widely used, is archaic, being inaccurate, slow and awkward, and inherently requires that the engine be stopped.

Also, it has been proposed, as for example, see United States Patent 2,691,888, that the beginning of cylinder fuel injection be determined by either (1) internally sensing the time of opening of the fuel injection nozzle valve or (2) internally sensing the build-up of fuel injection pressure at the injection nozzle. In this system, a stroboscopic circuit having a flashing lamp responsive to the sensed injection timing is used. The flash of the strobe-lamp illuminates timing reference markings on the flywheel or vibration damper mounted to the engine crankshaft to determine the timing of the engine. This system, and those like it, are limited by reason of being relatively complicated. They require complex, costly structural components, and modification of the fuel injection system is necessary. They are not readily usable in the field and normally require that the engine be shut down while the sensing device is installed.

In view of the foregoing, it is desirable to provide a fuel injection engine timing system for engines of the type described, which system is accurate, relatively simple structurally, inexpensive to purchase and use, easily used by non-technical persons in a comparatively short time, readily adaptable for field use, which does not require modification of the fuel injection structure to accommodate use of the timing system, and which can be positioned and used on a fuel injection line without stopping the engine.

The present invention provides such a timing system. In the preferred embodiment of this invention a sensing device is clamped about the external circumference of a fuel injection line with the line securely positioned in a recess in the sensing device. The sensing device comprises two co-extensive arms fastened together to form a jaw at one end near the fuel line receiving recess so as to accommodate relative pivotable movement of the arms with respect to each other caused by radial expansion of the fuel line as a charge of fuel to be injected passes through the line. A micro-switch contained within a stroboscopic circuit is attached to the opposite, distal end of one of the arms and is periodically actuated by the fuel line expansion to accommodate electrical transmission through the switch to flash a strobe-lamp. Specifically, the relative pivotable movement between the arms, as the fuel line is expanded, causes the second arm to close or open the micro-switch attached to the first arm.

Of course, the expansion of the fuel line is very slight, though definite, and, therefore, the described relative pivotable movement of the arms magnifies the fuel line expansion, the arc distance or distances traversed by the arm or arms, as the case may be, being greater than the magnitude of the fuel line expansion. The longer the arms, the greater will be the distance which separates the fuel line from the micro-switch and, accordingly, the greater will be the degree of the above-described magnification phenomenon. The time of each fuel injection, as measured by the strobe-lamp flashes, is correlated with the instantaneous engine crankshaft position by use of standard top dead center engine reference markings on the engine and the flywheel or vibration damper in the conventional timing manner, which is well known, need not be described. An adjustment plate is mounted on the second sensing arm to accommodate adjustment of the arcuate movement required to actuate the micro-switch and, accordingly, such adjustment controls the degree of sensitivity of the micro-switch.

Accordingly, it is a primary object of this invention to provide a novel timing system, including method and apparatus, for determining time of fuel injection in internal combustion engines of that type.

Another important object of this invention is the provision of a novel fuel injection timing system which senses from the exterior of a fuel injection line the passage of each charge of fuel through the line in correlation with the instantaneous position of the engine crankshaft.

A further valuable object is the provision of a novel r.p.m. counting system which senses from the exterior of the fuel injection line the passage of each charge of fuel through the line per unit of time.

An additional object of this invention is the provision of a novel fuel injection timing system having one or more of the following features:

(1) highly accurate;
(2) compact and structurally simple;

(3) relatively inexpensive to purchase and operate;
(4) requires no modification to the fuel injection structure or the engine structure to accommodate its use;
(5) easy to use by ordinary non-technical personnel;
(6) readily usable in the field; and
(7) can be applied to and used in conjunction with an operating engine.

Other features and objects of this invention will become apparent from the following description and appended claims in conjunction with the accompanying drawings wherein:

FIGURE 1 is a schematic side elevational view of an internal combustion engine having a fuel injection timing apparatus of this invention externally mounted on one of the fuel injection lines;

FIGURE 2 is an enlarged schematic cross sectional representation of an engine cylinder with a fuel injection nozzle and fuel line with the sensing device of this invention externally secured to the fuel line adjacent the nozzle;

FIGURE 3 is a graphic representation of the pressure build up, with respect to time in a fuel injection line when fuel is injected;

General

Figure 6:
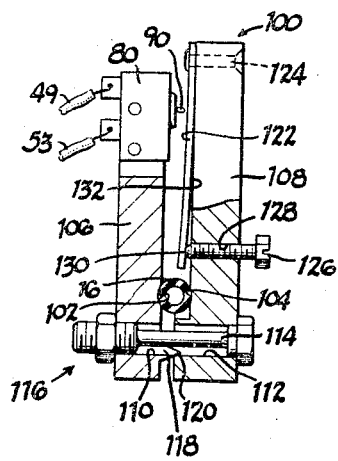
FIGURE 6 is a front elevational view of a second, presently preferred fuel injection sensing device embodiment of this invention.

Referring now to the drawings wherein like numerals are used throughout to designate like parts, FIGURE 1 schematically illustrates an internal combustion engine 10 of the fuel injection type wherein an apparatus 12, for determining the fuel injection timing of the engine, is externally attached by means of a sensing device 14 to the circumferenetial surface of one fuel injection line 16 immediately adjacent a fuel injection nozzle, generally designated as 18. The nozzle 18 is secured in a head 20 (FIGURE 2) of a cylinder 22, which cylinder contains a piston 24. Of course, the sensing position may be at any exterior point along the fuel line, the injection delay or the time required for the charge of fuel to move between the sensing position to the injection nozzle being taken into account. The engine 10 may, of course, be operated on any desired cycle, and may be either of the spark or compression ignition type.

The internal combustion engine 10 is equipped with not only the head 20 but also with a block 26, an oil pan 28, a vibration damper 30 and a flywheel 32. Both the vibration damper 30 and the flywheel 32 are attached to the ends of the engine crankshaft 33 at 34 and 36, respectively. Fuel is delivered from a common injection pump 38 periodically through fuel injection lines 16, 40, 42 and 44, lines 40, 42 and 44 being broken away in FIGURE 1 for simplicity and clarity. Since fuel injection lines 16, 40, 42 and 44 all function in an identical manner, only the functioning of the fuel injection line 16 will hereinafter be described.

Introduction of a charge of fuel into the fuel line 16 by the injection pump 38 induces an instantaneous high pressure upon the walls of the fuel line 16 adjacent the fuel charge as the fuel charge passes between the injection pump 38 and the injection nozzle 18. This sharp pressure rise is illustrated graphically in FIGURE 3 and is sufficient to cause a measurable amount of expansion due to pressure induced stress imposed on the fuel line 16.

Generally speaking, the sensing device 14, which is clamped about the external circumference of the fuel line 16 in surface-to-surface secured relation therewith at a position immediately preceding the nozzle 18, although it can be positioned elsewhere along the line, senses the fuel injection expansion of the fuel line 16 responsive to the passage of each charge of fuel therethrough. Each time the device 14 senses the fuel line expansion, it actuates a switch within the sensing device 14, in a manner to be subsequently described in greater detail, to trigger the strobe-lamp 46 by induction or the like causing the voltage V to flash the lamp. FIGURE 1 illustrates the stroboscopic circuit 48, of which the strobe-lamp 46 forms a part, which, in addition to leads 45 and 47 voltage source V, which may be a battery, a 110 v. household outlet or the like, further comprises a battery 50 of low voltage type and leads 49, 51 and 53. The periodic flashing of the strobe-lamp 46 responsive to the passage of the periodic charges of fuel through line 16 may be utilized in a conventional manner to illuminate timing reference markings on the flywheel 32 in conjunction with the usual engine stationary marking. This procedure is well known and need not be further described in this specification. Alternatively, markings on the vibration damper 30 in conjunction with a stationary engine marking may be correlated with the flashing of the strobe-lamp 46 (shown in phantom lines immediately above the vibration damper 30 in FIGURE 1). Thus, the instantaneous position of the crankshaft may be correlated with the time of fuel injection into cylinder 22 to determine the injection timing of the engine 10. Adjustment of the injection timing may be made in the conventional manner.

Alternatively, the stroboscopic circuit 48 may be utilized simultaneously with or separate from the above-described timing operation to actuate an r.p.m. counter 52 each time the device 14 is actuated by electrical connection from leads 49 and 51 through leads 54 and 56 when a switch 58 is closed. The circuit 48 in conjunction with the sensing device 14 may also be used to measure the rate of fuel injection advance with increased engine r.p.m. which when compared with the known engine injection advance characteristics will inform thhe operator as to whether or not the engine injection timing advance device (not shown) is working properly.

Three embodiments of the sensing device 14 of FIGURES 1 and 2 are illustrated in FIGURES 4–5, 6–7, and 8–9, respectively, which embodiments will be presently described.

Figure 4:
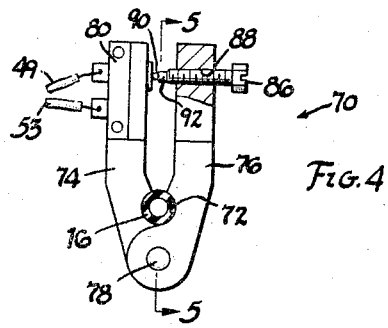
FIGURE 4 is a front elevational view of one fuel injection sensing device embodiment of this invention.
Figure 5:
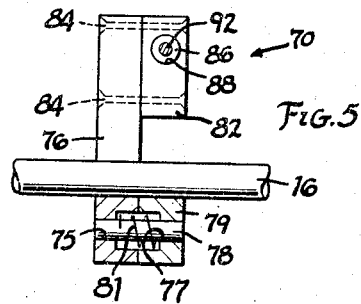
FIGURE 5 is an elevational view of the embodiment of FIGURE 4 taken along line 5—5 of FIGURE 4.

The sensing device of FIGURES 4 and 5

The embodiment of FIGURES 4 and 5 illustrates a fuel line expansion sensing device 70, which externally holds the fuel line 16 securely in recess 72 and comprises two generally co-extensive arms 74 and 76 which are fastened together by means of apertures 75 and 77 and a pivot pin 78. Aperture 77 is formed in an offset portion 79 of arm 76. This pivot pin connection accommodates relative rotational or pivotable movement about pin 78 of the arms 74 and 76, arms 74 and 76 forming a jaw structure which is openable and closable. The arms 74 and 76 are normally biased toward each other by a torsion spring 81. A micro-switch 80 is mounted near the distal end of arm 74, micro-switch 80 constituting part of the stroboscopic circuit 48 of FIGURE 1. The arm 76 carries integral therewith an offset portion 82, secured to arm 76 by means of countersunk screws 84, or the like. An adjustment screw 86 threadedly engages an aperture 88 to accommodate movement of the screw 86 relative to the arm 76. The micro-switch 80 has an actuating push button 90 extending in alignment with tip 92 of the adjustment screw 86. Thus, micro-switch 80, being of the type which is closed when the push button 90 is fully extended, adjustment screw 86 following placement of the fuel line 16 securely in the recess 72 as illustrated, is screw-advanced toward arm 74 a distance sufficient to depress the push button 90 and thereby open the micro-switch 80. Thus, by use of the adjustment screw 86, fuel lines of different sizes may be sensed and variations in manufacturing tolerances may easily be accommodated.

Hence, in operation, expansion of the fuel line 16 responsive to passage of each charge of fuel therethrough, creating a pressure impulse as depicted in FIGURE 3, exerts a radial force against the arms 74 and 76 and recess 72. This causes the arms to pivot relative away from each other about pin 78 since the pin 78 is beneath the line 16. Thus, the tip 92 of the adjustment screw 86 is displaced clockwise as viewed in FIGURE 4 and the push button 90 of the micro-switch is displaced counterclockwise as viewed in the same figure. Inasmuch as arms 74 and 76 act as levers the total arc displacement of the push button 90 and the tip 92 will be significantly greater than the magnitude of expansion of the fuel line 16, the longer the length of arms 74 and 76 the greater the magnification of displacement.

This opposite rotation of arms 74 and 76 about pin 78 permits push button 90 to be fully extended, thus closing the micro-switch 80 and allowing (with reference to FIGURE 1) flow of electrical potential through leads 49 and 53 to flashingly illuminate the strobe-lamp 46 as each charge of fuel passes through the line 16. As previously described, the timing reference markings on the flywheel or the vibration damper are utilized in conjunction with a fixed reference engine marking to determine the timing with respect to fuel injection into the engine cylinder 22 and the instantaneous position of the engine crankshaft. Of course, in the conventional manner, the timing of fuel injection with respect to the instantaneous position of the crankshaft may be altered in a conventional manner to adjust the timing of the engine 10.

Figure 7:
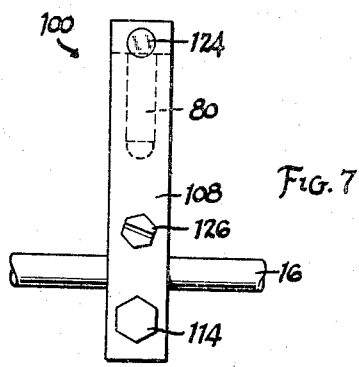
FIGURE 7 is a side elevational view of the embodiment of FIGURE 6.

The sensing device of FIGURES 6 and 7

A second and presently preferred sensing device embodiment of this invention is illustrated in FIGURES 6 and 7 to which reference is now made. A sensing device 100 is adapted for externally clamping the fuel line 16 securely in a recess composed of recess regments 102 and 104, respectively, situated in arms 106 and 108 which a jaw like structure similar to the sensing device 70 of FIGURES 4 and 5. Arms 106 and 108 are provided with respective apertures 110 and 112 through which a bolt 114 of a bolt and nut assembly 116 passes. When the nut and bolt assembly 116 is secured in the tightened illustrated position of FIGURE 6, a pivot edge 118, integral with and projecting from the arm 106 immediately adjacent the aperture 110 and beneath the bolt 114, is fitted into a matching recess 120 which is alignedly placed in the arm 108 immediately adjacent the aperture 112 and beneath the bolt 114. The combination of projecting knife edge 118 and recess 120 provides a pivot axis accommodating relative rotational or pivotable movement of the arms 106 and 108 away from each other each time the fuel line 16 is expanded responsive to the passage of the charge of fuel therethrough.

Arm 106 carries, at its distal end, a micro-switch designated 80 which is or may be identical with thhe micro-switch 80 of the FIGURES 4 and 5. Thus, micro-switch 80 is open when push button 90 is depressed and closed when the push button 90 is extended.

The other arm 108 of sensing device 100 carries a leaf spring 122 along its interior face mounted and held in position by a rivet 124 or the like. The leaf spring 122 is adapted for hinged movement about the rivet 124 responsive to threaded displacement of an adjustment screw 126 which is threadedly received in an aperture 128 in the arm 108. Extension or forward displacement of the adjustment screw 126 into the threaded aperture 128 causes screw tip 130 of the adjustment screw to contact the surface 132 of the leaf spring 122 causing leftward pivotable displacement of the lower end of the leaf spring 122 about the rivet 124.

Once the fuel line 16 has been securely fixed in the recessed components 102 and 104 and the nut and bolt assembly 116 has been secured in tightened position so as to abut the exterior surfaces of the arms 106 and 108, the adjustment screw 126 is rotated so as to displace the leaf spring 122 in the manner previously described a distance sufficient to cause the leaf spring 122 to depress the push button 90 of the micro-switch 80 causing the micro-switch 80 to open.

Thus, in this position, expansion of the fuel line 16 responsive to the passage of each charge of fuel therethrough will cause relative pivotable movement of the arms 106 and 108 away from each other about the pivot axis formed between projecting knife edge 118 and its mating recess 120. This movement magnifies or enlarges the magnitude of fuel line expansion and will cause the leaf spring 122 to move out of engagement with the push button 90 of the micro-switch 80, thus, opening the micro-switch 80 to illuminate the strobe-lamp 46 of the stroboscopic circuit 48 (FIGURE 1). When the fuel line 16 has completed its expansion and resumes its normal at rest dimensions, the leaf spring 122 will again have contacted push button 90 to open the micro-switch 80.

Thus, each fuel line expansion closes the micro-switch 80 to accommodate flow of electrical potential through the stroboscopic circuit 48 to cause the strobe-lamp 46 to flash. The flashing strobe-lamp 46 may, thus, be utilized in conjunction with top dead center crankcase engine reference markings to determine the timing of the engine 10. Subsequently, if desired, the fuel injection timing may be adjusted so that the instantaneous position of the engine crankshaft is differently correlated with respect to the time of the fuel injection, in order to produce the desired combustion characteristics.

Thus, by utilizing the combination of the leaf spring 122 and the adjustment screw 126, the sensitivity of the micro-switch 80 may be altered. Furthermore, the sensing device 100 by use of nut and bolt assembly 116 in conjunction with leaf spring 122 and adjustment screw 126 may be adjusted to accommodate variations in the size and variations in manufacturing tolerances of fuel lines.

Figure 8:
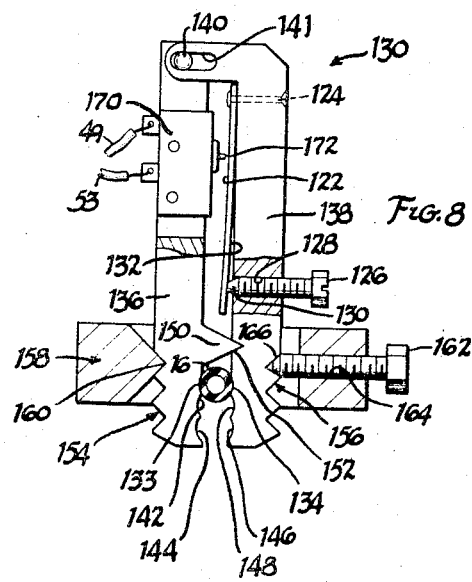
FIGURE 8 is a front elevational view of a third fuel injection sensing device embodiment of this invention.
Figure 9:
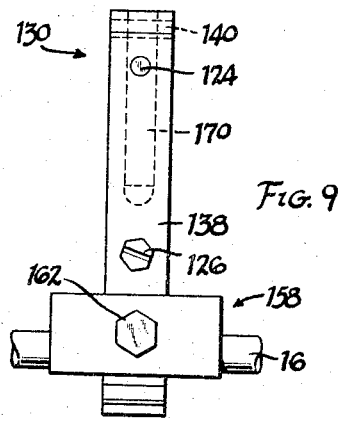
FIGURE 9 is a side elevational view of the embodiment of FIGURE 8.

The sensing device of FIGURES 8 and 9

Reference is now made to the sensing device embodiment depicted in FIGURES 8 and 9. As illustrated, a sensing device 130 is accommodated in a recess comprising recess components 133 and 134, respectively, situated in a pair of spaced, generally co-extensive arms 136 and 138, which in combination form an openable and closable jaw structure. The arms 136 and 138 are fastened together by means of a pin 140, a slot 141 in arm 138 accommodates movement of the pin 140 during utilization of the sensing device 130. The arms 136 and 138 are respectively provided with two additional sets of recessed segments, i.e. 142, 144 and 146, 148, which may be of the same or of different sizes. The fuel line 16 may, thus, be accommodated in any set of recess components according to the response sensitivity desired and the size of the fuel line. For purposes of simplicity, the following description directed toward the sensing device 130 will proceed on the basis that the fuel line 16 is securely positioned in the recessed components 133 and 134 as illustrated in FIGURE 8.

The arm 136 is provided with a pivoting knife edge 150 which projects from the arm 136 and is matingly accommodated within the recess 152 in the arm 138 to form a pivot axis. The arms 136 and 138 are respectively provided with a series of serrations 154 and 156, respectively. A clamp 158, shaped in the form of a C, has a projecting edge 160, which may be fitted into any one of the three serrations designated 154, being fitted in the top serration in FIGURE 8. The clamp 158 is provided with a screw 162 threadedly received in an aperture 164 of the clamp which has a forward projection tip 166 adapted to engage any selected serration of those designated 156. In this instance, the top serration 156 is engaged since it corresponds with the top serration 154 engaged by the edge 160.

When the clamp 158 is tightened into the illustrated position, the fuel line 16 is secured as depicted and the arms 136 and 138 are thereby positioned for relative pivotable movement toward each other rather than away from each other as was the case with the sensing devices 70 and 100 previously described. This relative pivotable movement towards each other by arms 136 and 138 is occasioned by reason of the fact that the pivot axis formed by engagement between the projecting knife edge 150 and the recess 152 is located adjacent to and immediately above rather than immediately below the fuel line 16.

Near its distal end, the arm 136 is provided with a micro-switch 170 which is similar to the micro-switch 80 except micro-switch 170 is opened when the push button 172 is fully extended and closed when the push button 172 is depressed.

The arm 138 is provided with a leaf spring and adjustment screw assembly identical with the one illustrated and described in conjunction with FIGURES 6 and 7. The leaf spring and adjustment screw of FIGURES 8 and 9 has been designated with numerals identical to the numerals appearing in FIGURES 6 and 7 and functions in an identical manner as previously described. Hence, no further description of these components is deemed necessary in conjunction with this embodiment.

Of course, when the fuel line 16 is securely positioned as illustrated in FIGURE 8, the adjustment screw 126 will be displaced toward the left by means of its threaded engagement at aperture 128 only a distance sufficient to bring the leaf spring 122 near to or just in contact with the push button 172 of the micro-switch 170. Further movement of the leaf spring 122 would depress the pushbutton 172 causing the micro-switch 170 to remain closed at all times and, therefore, would make the micro-switch non-responsive to the expansion of the fuel line 16 as each charge of fuel passes therethrough.

Thus in operation, the periodic expansion of the fuel line 16 responsive to the movement of a charge of fuel therethrough, will cause the arms 136 and 138 to pivot toward each other about the pivot axis formed by the projecting knife edge 150 and the recess 152. This causes periodic closing and opening of the micro-switch 170 to flash the strobe-lamp 46 of the stroboscopic circuit 48 (FIGURE 1), which strobe-lamp flashings are utilized to determine the fuel injection timing of the engine 10 in conjunction with timing reference markings on the engine as previously described.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an apparatus for determining the fuel injection timing of an internal combustion engine of the fuel injection type, a sensing device comprising a pair of closely spaced, essentially co-extensive, relatively oppositely pivotable jaw arms fastened together by securing means near one extremity thereby forming a common pivot point, means near said pivot point circumscribing a portion of the external circumferential peripheral surface of a fuel injection line, signal generating means carried upon one jaw arm and actuatable by relative pivotable movement of the other jaw arm responsive to radial expansion of the fuel line as a charge of fuel passes therethrough, and means responsive to actuation of said signal generating means to correlate said actuation with the instantaneous position of the engine crankshaft.

2. An apparatus as defined in claim 1 wherein said signal generating means includes a switch and further comprising adjustment means for varying the magnitude of relative pivotable movement required to actuate the switch.

3. An apparatus as defined in claim 1 wherein said last-mentioned responsive means includes a stroboscopic circuit having a signal-actuated stroboscopic lamp for correlating the time of fuel injection with the relation between top dead center reference markings on the engine.

References Cited

UNITED STATES PATENTS 1,861,999  6/1932  Bowlus _____ 73—151 X

FOREIGN PATENTS 1,186,510  2/1959  France.

OTHER REFERENCES

Judge, A. W., The Testing of High Speed Internal Combustion Engines, fourth edition revised. London, Chapman and Hall Ltd., 1955. Pages 375–578. TJ 759 J8.

RICHARD C. QUEISSER, Primary Examiner.

J. W. MYRACLE, Assistant Examiner.